United States Patent [19]

Vilen

[11] Patent Number: 4,500,210

[45] Date of Patent: Feb. 19, 1985

[54] MIXING APPARATUS

[75] Inventor: Erik O. Vilen, La Grange Park, Ill.

[73] Assignee: Blakeslee, A division of Blako, Inc., Cicero, Ill.

[21] Appl. No.: 496,544

[22] Filed: May 20, 1983

[51] Int. Cl.³ .............................................. B01F 7/30
[52] U.S. Cl. ..................................... 366/207; 366/279
[58] Field of Search ...................... 248/125, 651, 669; 366/197, 200, 201, 207, 254, 279, 285, 286, 605

[56] References Cited

U.S. PATENT DOCUMENTS 1,465,633 8/1923 Gilchrist ............................. 366/207
1,733,945 10/1929 Dehoff ................................. 366/207

Primary Examiner—Robert W. Jenkins
Assistant Examiner—Arthur D. Dahlberg
Attorney, Agent, or Firm—Emrich & Dithmar

[57] ABSTRACT

A mixing apparatus having a bowl lift arrangement which includes a yoke which is attachable to the mixing bowl and which includes only one guide rod for supporting the yoke, the guide rod being located in the forward portion of a support column which supports the drive motor housing above the base of the mixing unit, and the guide rod being centered to extend vertically along and an axis co-planar with the axis of the bowl. The bowl lift arrangement further includes a screw shaft extending parallel to and behind the guide rod and which has one end received in a threaded aperture provided in the rearward end of the base portion of the yoke, the other end of the screw shaft being linked to a handle, turning of which causes rotation of the screw shaft, with the yoke riding up or down on the screw shaft as it is rotated, carrying the bowl up or down.

8 Claims, 4 Drawing Figures

MIXING APPARATUS

This invention relates to motor driven mixing or stirring apparatus, and particularly to an improved bowl mounting arrangement for such apparatus.

Mixing machines are used commercially in a wide range of applications including pizza operations, bakeries and regular kitchen operations. Commercial mixing machines commonly employ very large mixing bowls having capacities of 60 quarts or more, for example. Generally, in large commercial mixing machines, the motor housing, or head, is mounted on a support column, and is maintained a fixed distance above the base of the unit. To position or remove the mixing bowl, without removing the beater, arrangements have been provided for raising and lowering the mixing bowl relative to the beater.

In one bowl lift arrangement in use at present, the bowl is supported from a pair of vertical guide shafts by way of yoke. The yoke has a pair of arms projecting from a base portion of the yoke, the arms extending around the sides of the bowl and being attached to the bowl. The base portion has a pair of bushings which are slidably movable along the guide shafts as the yoke is raised or lowered. In another arrangement, the yoke is provided with a horizontally extending guide member, the ends of which are located in a pair of guide rails which extend vertically along the sides of the unit. Drive mechanisms employed in those arrangements include chain/sprocket drives or cam disc drives, for example. These known bowl lift arrangements require two parallel guide shafts or guide rails. Thus, precision is required in manufacturing the assembly and servicing the mixing unit because of the close tolerances necessary to avoid the possibility that the yoke could bind as it is moved along the guide members in raising or lowering the mixing bowl.

SUMMARY OF THE INVENTION

The present invention provides an improved mixing bowl support arrangement for a mixing apparatus. The bowl mounting arrangement includes a bowl support member having a yoke portion having first and second arms which are attachable to the mixing bowl at oppositely disposed locations along the periphery of the bowl. A base portion adapted to be raised or lowered as desired by the user, and a single guide portion extending inwardly of a vertical support of the mixing apparatus. The support arrangement further includes a guide means which cooperates with the guide portion for raising or lowering the bowl support member. The influence of the guide means causes the bowl support member to be drawn against the vertical support of the mixing unit surfaces of which define bearing surfaces. This prevents torquing of the bowl when the mixing apparatus is in use. The guide means comprises a rod located in the forward portion of the support column of the mixing unit, and centered to extend vertically. The guide rod extends through a hole in the guide portion of the bowl support member and guides it in its vertical travel as it is raised and lowered.

For the purpose of raising and lowering the bowl, the bowl supporting arrangement includes a screw shaft extending parallel to and, preferably, behind the guide rod and which has one end received in a threaded hole provided in the guide portion of the bowl support member. The other end of the screw shaft is linked to a drive means, which may be a motor or a crank handle, operation of which causes rotation of the screw shaft. The bowl support member rides up on the screw shaft as it is rotated in one direction, and rides down on the shaft as it is rotated in the opposite direction, carrying the bowl up or down.

The mixing bowl support arrangement provided by the present invention, which employs only a single guide and a simple drive mechanism requires fewer components than arrangements presently in use. Also, since the surfaces of the vertical support of the mixer serve only as bearing surfaces for the tool support member, and are not effective in guiding the bowl support member in its vertical travel, less precision is required in manufacturing, assembly and servicing of the mixing unit. Moreover, in accordance with a feature of the invention, the column support comprises a commercially available H-beam member which requires no fabrication to add rigidity to the mixing unit assembly. Column structures used in mixing units presently available require special casting and/or welding during manufacturing to enable the support column to withstand loading affects which occur during operation of the unit. Other advantages and features of the invention will become apparent from the following detailed description.

DESCRIPTION OF PREFERRED EMBODIMENTS

Figure 1:
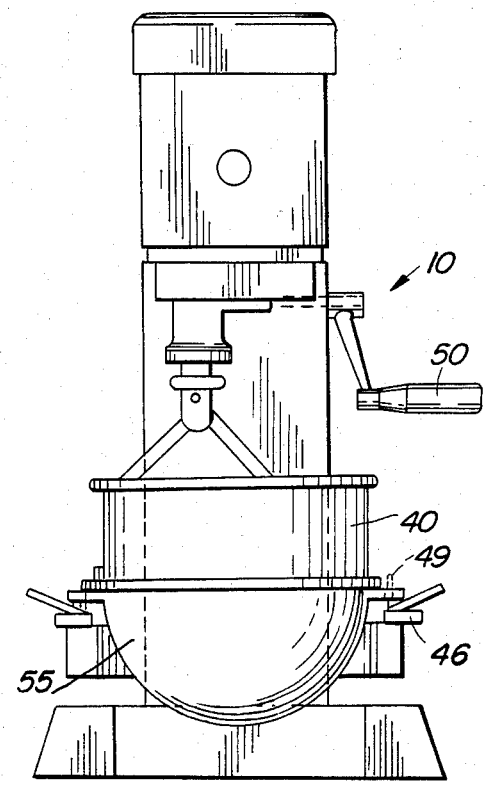
FIG. 1 is a front elevation view of mixing apparatus including a bowl mounting arrangement provided by the present invention.
Figure 2:
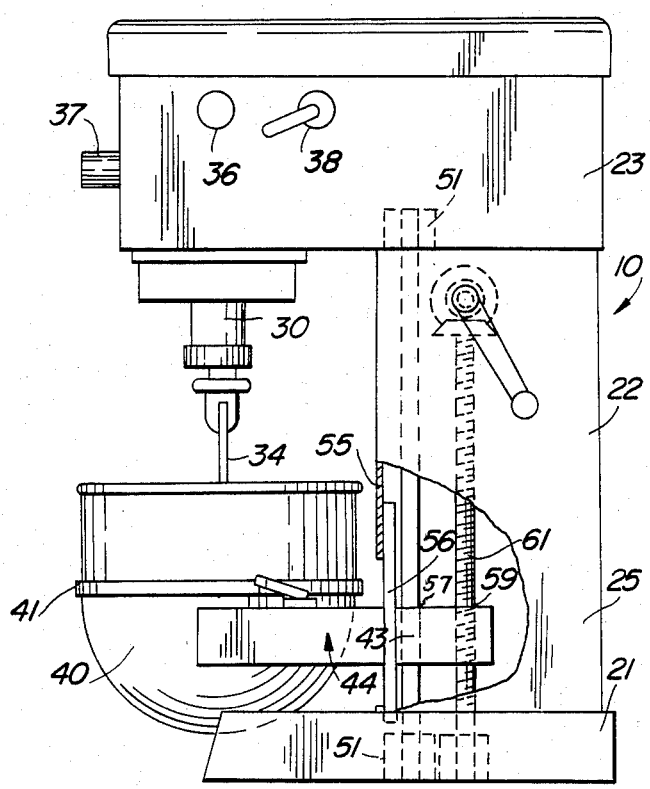
FIG. 2 is a side elevation view of the mixing unit shown in FIG. 1.
Figure 3:
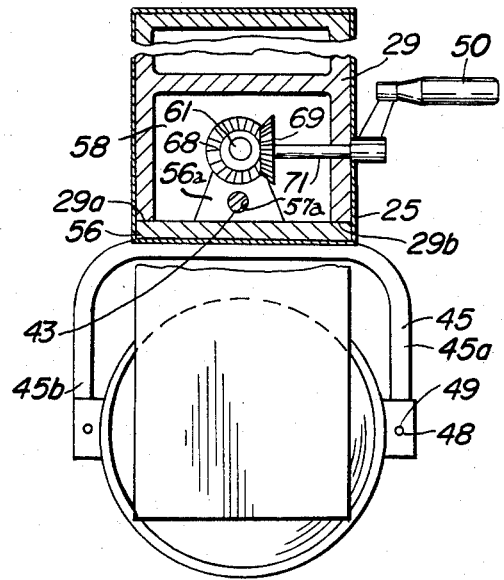
FIG. 3 is a top play view of the mixing unit shown in FIG. 1.

Referring to FIGS. 1 and 2 of the drawings, reference numeral 10 indicates a power driven combination mixing and grinding machine of the commercial type and which includes a mixing bowl mounting arrangement provided by the present invention. The mixing unit includes a base 21, a hollow support column 22 and a motor support mixer or head 23 which is mounted on the top of the column 22 and extends beyond the column to overhang a portion of the base 21. The support column 22 is a support member 29 which is of an H-beam construction, as indicated in FIG. 3, which provides increased strength and rigidity for the mixing machine. The support member 29, generally is preferably enclosed within a housing cover 25, attached to the support member 29. The housing cover 25 provides a cosmetic covering over the H-beam support column and may be of any desired covering material, such as stainless steel, enameled metal or the like. The housing 23 includes a support frame (not shown) which is attached to the top of the column 22.

The motor head 23 encloses the drive motor and the multiple speed transmission drive (not shown) the drive shaft of which is coupled to a vertically extending tubular casing 30 which includes a socket for receiving the shank of the beater 34 or other attachment. The beater 34 is insertable into the holder in the casing and is removably secured thereto as is known in the art. A power take off is provided at 37 for driving an auxiliary unit such as a grinder. An on-off switch 36 mounted on the side of the housing enables energization and deenergization of the drive motor. A speed select lever 38 enables selection of the desired speed for the beater rotation.

As indicated above, the mixing apparatus is a commercial unit, and it is designed for use with relatively large mixing bowls having a capacity, for example, of 60 Liters. The bowl mounting arrangement provided in accordance with the invention, permits removal of the bowl without removing the mixing beater.

The bowl 40 has a horizontal flange 41 which is supported from a vertical guide rod 43 by a bowl support member 44 which includes a semi-circular yoke 45. The yoke has a pair of arms 45a and 45b which extend around opposite sides of the bowl and define laterally and oppositely disposed holes 48 in the ends thereof which are engaged by vertical pins 49 located on the horizontal flange of the bowl. This pin/hole arrangement locates the bowl on the yoke and assists in securing the bowl to the yoke and thus to the vertical rail. The yoke 45 carries a suitable spring-pressed tongue or latch 46 which engages and retains the flange of the bowl securing it to the yoke. An adapter yoke (not shown) may be provided to permit the use of smaller size bowls.

The mounting apparatus includes a handle 50 rotation of which imparts vertical movement to the bowl support member 44 along the guide rod 43 to accommodate different bowls and to raise or lower the same to the desired height. Referring to FIG. 3, the base portion 56 of the bowl support member 44, which is generally rectangular in shape, has an extension 56a, which defines a guide portion of the bowl support member, and which has an aperture 57 which defines a bearing sleeve 57a in which the guide rod 43 rides.

More specifically, with reference to FIG. 2, the guide rod 43 has its upper and lower ends secured to mounts 51 which are carried by the vertical column 22. The guide rod 43 is located in the forward portion of the support column, in a compartment 58 defined by the H-beam 29 and the base portion 56. The edges 29a and 29b of support column 29 define bearing surfaces which are engaged by the back surface of the base plate portion 56.

The engagement of the two ends 29a and 29b of the support column by the edges of base plate, and the guide rod 43 threading the aperture 57 in the guide portion 56a of the bowl support member define three points of contact. The influence of the guide rod causes the bowl support member to be drawn backward, keeping tight engagement between the bowl support and the support column. This prevents torquing of the bowl when the mixing unit is in use.

Further, the guide rod 43 cooperates with the bowl support member 44 to align the bowl relative to the agitator as the bowl is raised. As indicated, the surfaces 29a and 29b of the support column 29 define bearing surfaces, but do not define guide tracks for the bowl support. Limited lateral movement of the bowl support 44 is possible as the bowl support is raised or lowered while in use. This arrangement also relaxes manufacturing tolerances in that during assembly, the guide rod assembly can be mounted in such a position as required to locate the bowl support member in the proper position.

As shown in FIGS. 2 and 3, the drive mechanism for the mixing bowl mounting arrangement includes a threaded rod or screw shaft 61. The shaft 61 extends vertically within the compartment 58 and, preferably, directly behind and parallel to the guide rod 43. The lower end of the shaft 61 extends through a tapped aperture 59 (FIG. 2) in the extension 56a at the base of the yoke 45. The upper end of the screw shaft 61 carries a beveled gear 68 which is engaged by a further beveled gear 69 which together with gear 68 define a planetary gear system which translates circular motion of the crank 50, via shaft 71, into rotational motion of the screw shaft. Thus, as the crank 50 is turned clockwise, the screw shaft is rotated in one direction, causing the bowl support to be driven upward. As the crank is turned counterclockwise, the screw shaft is rotated in the opposite direction causing the bowl support to be driven downward.

In one embodiment, for a 60 Liter bowl, the bowl lift mechanism lifts the bowl six inches. The base plate was approximately 30 inches high and 24 inches wide. The height of the column 22 above the floor was approximately thirty-four inches. The tall column construction, together with the bowl mounting arrangement, allows bowl removal without removing the agitator.

Figure 4:
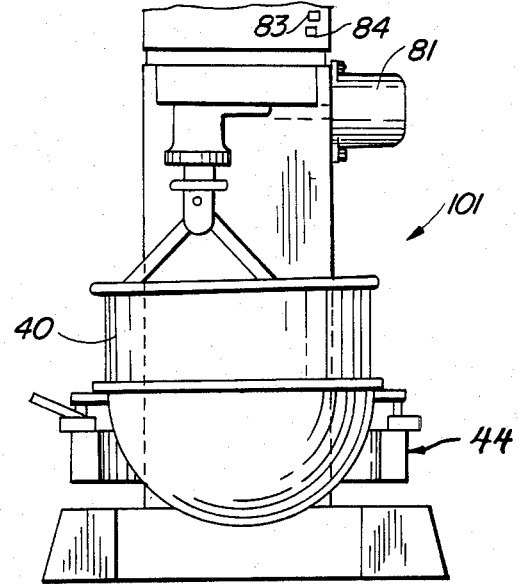
FIG. 4 is a front view of a mixing unit similar to that of FIG. 1, but which employs a drive motor in the bowl mounting arrangement.

Referring to FIG. 4, there is shown a further embodiment of a mixing unit 101 of the invention. The mixing 101 is similar to the mixing unit 10 shown in FIG. 1, but employs a power bowl lift to raise or lower the bowl 40 to the desired position. To this end, a reversible drive motor 81 is provided in place of the handle 59 for the manually operated unit. The motor, shown mounted on the side of the unit, could be mounted in the support column. The output shaft of the motor 81, which maybe a ⅓ hp motor is coupled to the input drive gear 69 (relocated to the rear edge of gear 68 when the motor is within the support column) of the planetary gear system shown in FIG. 3 for unit 10 to drive the bowl support member 44 up or down, the bowl support member being moved along the guide rail 43 as described above for the unit 101. Also, suitable controls 83 and 84 are provided on the front surface of the motor housing 23 to enable selective energization of the motor to cause the bowl support to be raised or lowered as desired. In other aspects, the power lift arrangement is for unit 10' is identical with that of unit 10.

I claim:

1. For use with a mixing apparatus, a bowl support arrangement which is self-aligning with respect to the mixing apparatus, said support arrangement comprising:
a bowl support member having:
(a) a yoke portion adapted to receive and hold a mixing bowl,
(b) a base portion adapted to be raised and lowered as desired by the user thereof, and
(c) a single guide portion defining an aperture extending inwardly from said base portion into the mixing apparatus;
a guiding means comprising a guide rod mounted inwardly of said mixing apparatus and passing through said aperture and defining a single vertically extending guide rail for said bowl support member, said guiding means engageable by said single guide portion of said bowl support member for raising and lowering said bowl support member as desired, and
a bearing surface means engageable by said base portion of said bowl support member, with said guiding means and said bearing surface means cooperating with said bowl support member to maintain and to support said bowl support member when the mixing apparatus is operative and to provide a load bearing surface between said bearing surface means and said base portion during the mixing operation.

2. A bowl support arrangement according to claim 1 wherein said bearing surface means comprises first and second surface portions of a vertical support member of said mixing apparatus.

3. A bowl support arrangement according to claim 1 wherein said guide means further comprises drive means coupled to said guide portion of said bowl support member and operable to raise or lower the bowl support member.

4. In a mixing apparatus including a base, and a housing mounted on said base and including a vertically extending support portion and a portion extending horizontally from the top of the vertical portion to overhang the base, a drive shaft extending downwardly from the housing portion and adapted to receive a motor driven agitating tool for mixing or beating a substance contained in a mixing bowl supported by the housing, an arrangement for supporting the bowl on said housing comprising:

bowl support means including a yoke portion having first and second arms adapted to receive and hold the mixing bowl; a base portion adapted to be raised and lowered to thereby raise and lower the mixing bowl, and a guide portion extending inwardly from said base portion into the mixing apparatus; a guide means including a vertically extending guide rod engageable by said guide portion of said bowl support means to guide said bowl support means in its vertical travel as it is raised and lowered, the vertical support portion defining at least one bearing surface engageable by said base portion of said bowl support means, with said guide means, and said bearing surfaces cooperating with said bowl support means to maintain and to support the mixing bowl when the mixing apparatus is in operation.

5. A mixing apparatus according to claim 4 wherein said guide means includes a screw shaft mounted within said support portion and extending vertically therewithin, said base portion of said bowl support member having a tapped hole through which said screw shaft extends, and means for rotating said screw shaft, said bowl support means riding upward on said screw shaft with rotation of the screw shaft in one direction and riding downward with rotation of the screw shaft in the opposite direction.

6. A mixing apparatus according to claim 4 wherein said means for rotating said screw shaft comprises a crank handle coupled to said screw shaft.

7. A mixing apparatus according to claim 4 wherein said means for rotating said screw shaft comprises a motor having its drive shaft coupled to said screw shaft.

8. For use with mixing apparatus, a bowl support arrangement which is self-aligning with respect to the mixing apparatus, said support arrangement comprising:
a bowl support member having:
(a) a yoke portion adapted to receive and hold a mixing bowl,
(b) a base portion adapted to be raised and lowered as desired by the user thereof, and
(c) a single guide portion extending inwardly from said base portion into the mixing apparatus;
a guiding means engageable by said single guide portion of said bowl support member for raising and lowering said bowl support member as desired,
a bearing surface means engageable by said base portion of said bowl support member, with said guiding means and said bearing surface means cooperating with said bowl support member to maintain and to support said bowl support member when the mixing apparatus is operative and to provide a load bearing surface between said bearing surface means and said base portion during the mixing operation, and
a vertical support member having first and second parallel side members and a cross member portion extending between said side members intermediate the ends thereof defining generally H-shaped configuration for said support member, with corresponding ends of such support member defining said bearing surface means.

* * * * *

UNITED STATES PATENT AND TRADEMARK OFFICE
CERTIFICATE OF CORRECTION

PATENT NO. : 4,500,210
DATED : February 19, 1985
INVENTOR(S) : Erik O. Vilen

It is certified that error appears in the above—identified patent and that said Letters Patent is hereby corrected as shown below:

Column 1, line 21 before the first yoke insert --a--;

Column 4, line 31 delete "59" insert --50--;

Column 4, line 41 delete "101" insert --10--;

Column 4, line 45 delete "10'" insert --101--.

Signed and Sealed this

Thirtieth Day of July 1985

[SEAL]

Attest:

DONALD J. QUIGG

Attesting Officer　　　Acting Commissioner of Patents and Trademarks